US008850342B2

(12) United States Patent
DeLuca et al.

(10) Patent No.: US 8,850,342 B2
(45) Date of Patent: Sep. 30, 2014

(54) SPLITTING AVATARS IN A VIRTUAL WORLD

(75) Inventors: Lisa Seacat DeLuca, San Francisco, CA (US); Martin Oberhofer, Bondorf (DE)

(73) Assignee: International Business Machines Corporation, Armonk, NY (US)

( * ) Notice: Subject to any disclaimer, the term of this patent is extended or adjusted under 35 U.S.C. 154(b) by 1101 days.

(21) Appl. No.: 12/629,666

(22) Filed: Dec. 2, 2009

(65) Prior Publication Data

US 2011/0131510 A1 Jun. 2, 2011

(51) Int. Cl.
G06F 3/048 (2013.01)
A63F 13/40 (2014.01)
A63F 13/30 (2014.01)

(52) U.S. Cl.
CPC ......... *A63F 13/10* (2013.01); *A63F 2300/5553* (2013.01); *A63F 13/12* (2013.01); *A63F 2300/5533* (2013.01)
USPC .......................................... 715/764; 715/757

(58) Field of Classification Search
CPC ...................................................... G06F 3/0481
USPC ................................................ 715/706, 757
See application file for complete search history.

(56) References Cited

U.S. PATENT DOCUMENTS

| | | | | |
|---|---|---|---|---|
| 7,824,253 | B2 * | 11/2010 | Thompson et al. | 463/7 |
| 8,100,771 | B2 * | 1/2012 | Maeda et al. | 463/42 |
| 8,150,941 | B2 * | 4/2012 | Edecker et al. | 709/217 |
| 8,164,595 | B2 * | 4/2012 | Yabuki et al. | 345/440 |
| 2005/0086605 | A1 * | 4/2005 | Ferrer et al. | 715/745 |
| 2006/0123351 | A1 * | 6/2006 | Littlefield | 715/768 |
| 2008/0039164 | A1 * | 2/2008 | Shimada | 463/6 |
| 2008/0167122 | A1 * | 7/2008 | Maeda et al. | 463/30 |
| 2009/0055754 | A1 | 2/2009 | Finn et al. | |
| 2009/0102847 | A1 * | 4/2009 | Yabuki et al. | 345/440 |
| 2009/0144448 | A1 * | 6/2009 | Smith | 709/246 |
| 2009/0288015 | A1 * | 11/2009 | Fujioka | 715/747 |
| 2009/0307620 | A1 * | 12/2009 | Hamilton et al. | 715/764 |
| 2009/0319609 | A1 * | 12/2009 | Ferraro | 709/204 |
| 2010/0013828 | A1 * | 1/2010 | Castelli et al. | 345/418 |
| 2011/0004481 | A1 * | 1/2011 | Jones | 705/1.1 |

OTHER PUBLICATIONS

Owen Noel Newton Fernando, Kazuya Adachi and Michael Cohen, Phantom Sources for Separation of Listening and Viewing Positions of Multipresent Avatars in Narrowcasting Collaborative Virtual Environments, Proceedings of the 24th International Conference on Distributed Computing Systems Workshops, Hachioji, Tokyo, Japan, Mar. 23-24, 2004, pp. 170-175.

\* cited by examiner

*Primary Examiner* — William Titcomb
(74) *Attorney, Agent, or Firm* — Patterson + Sheridan, LLP

(57) ABSTRACT

Systems, methods and articles of manufacture are disclosed for splitting an avatar a split point in a virtual world. In one embodiment, a location in the virtual world may be designated as the split point. It may be determined that a first avatar has encountered the split point. The user may be prompted to specify whether to split the first avatar in a virtual world. Responsive to a request to split the first avatar, a second avatar may be created from the first avatar. The first avatar and the second avatar may be controlled independently in the virtual world and in response to user input. A user may also request to merge the first avatar and the second avatar. A third avatar may be created from the first avatar and the second avatar, responsive to the request to merge. The third avatar may include assets of both the first avatar and the second avatar.

24 Claims, 7 Drawing Sheets

| ASSET | AVATAR A | AVATAR B | AVATAR C |
|---|---|---|---|
| AGE | 21 | 49 | 34 |
| GENDER | FEMALE | FEMALE | FEMALE |
| COINS | 45 | 76 | 24 |
| PROFESSION | STUDENT | CEO | CONSULTANT |
| MARITAL STATUS | SINGLE | DIVORCED | MARRIED |

FIG. 3

SPLITTING AVATARS IN A VIRTUAL WORLD

BACKGROUND

1. Field

Embodiments of the invention relate to the use of immersive visual environments. More specifically, embodiments of the invention relate to techniques for splitting an avatar in a virtual world.

2. Description of the Related Art

A virtual world is a simulated environment which users may inhabit and interact with virtual objects and locations of the virtual world. Users may also interact with one another via avatars. An avatar generally provides a graphical representation of an individual within the virtual world environment. Avatars are usually presented to other users as two or three-dimensional graphical representations that resemble a human individual. Frequently, virtual worlds allow multiple users to enter the virtual environment and interact with one another. Virtual worlds are said to provide an immersive environment, as they typically appear similar to the real world and objects tend to follow rules related to gravity, topography, locomotion, physics and kinematics. Of course, virtual worlds can suspend or alter these rules as well as provide other imaginative or fanciful environments. Users typically communicate with one another through their avatars using text messages sent between avatars, real-time voice communication, gestures displayed by avatars, symbols visible in the virtual world, and the like. Virtual environments are typically presented as images on a display screen.

Some virtual worlds are described as being persistent. A persistent world provides an immersive environment (e.g., a fantasy setting used as a setting for a role-playing game, or a virtual world complete with land, buildings, towns, and economies) that is generally always available, and where events continue to occur, regardless of the presence of a given avatar. Thus, unlike non-persistent online games or multi-user environments, the virtual world continues to exist, and plots and events continue to unfold as users enter (and exit) the virtual world.

SUMMARY

One embodiment of the invention includes a computer-implemented method. The method may generally include configuring one or more computer processors to perform an operation. The operation may generally include determining one or more split points within a virtual world, wherein each split point corresponds to a point where a first avatar is selectively split within the virtual world into multiple copies; monitoring presence of the first avatar within the virtual world; in response to determining the avatar has encountered one of the plurality of split points, issuing a prompt to select whether to split the first avatar in the virtual world; responsive to the prompt, receiving a request to split the first avatar; creating a second avatar from the first avatar, responsive to the request to split the first avatar; and controlling actions of the first avatar and the second avatar independently of one another in the virtual world, in response to avatar control input.

Another embodiment of the invention includes a computer-readable storage medium containing a program, which, when executed on a processor, performs an operation. The operation may generally include determining one or more split points within a virtual world, wherein each split point corresponds to a point where a first avatar is selectively split within the virtual world into multiple copies; monitoring presence of the first avatar within the virtual world; in response to determining the avatar has encountered one of the plurality of split points, issuing a prompt to select whether to split the first avatar in the virtual world; responsive to the prompt, receiving a request to split the first avatar; creating a second avatar from the first avatar, responsive to the request to split the first avatar; and controlling actions of the first avatar and the second avatar independently of one another in the virtual world, in response to avatar control input.

Still another embodiment includes a system having one or more computer processors and a memory containing a program, which when executed by the one or more computer processors is configured to perform an operation. The operation may generally include determining one or more split points within a virtual world, wherein each split point corresponds to a point where a first avatar is selectively split within the virtual world into multiple copies; monitoring presence of the first avatar within the virtual world; in response to determining the avatar has encountered one of the plurality of split points, issuing a prompt to select whether to split the first avatar in the virtual world; responsive to the prompt, receiving a request to split the first avatar; creating a second avatar from the first avatar, responsive to the request to split the first avatar; and controlling actions of the first avatar and the second avatar independently of one another in the virtual world, in response to avatar control input.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 3 illustrates a table that lists assets of avatars in the virtual world, according to one embodiment.

DETAILED DESCRIPTION OF THE PREFERRED EMBODIMENTS

Figure 1:
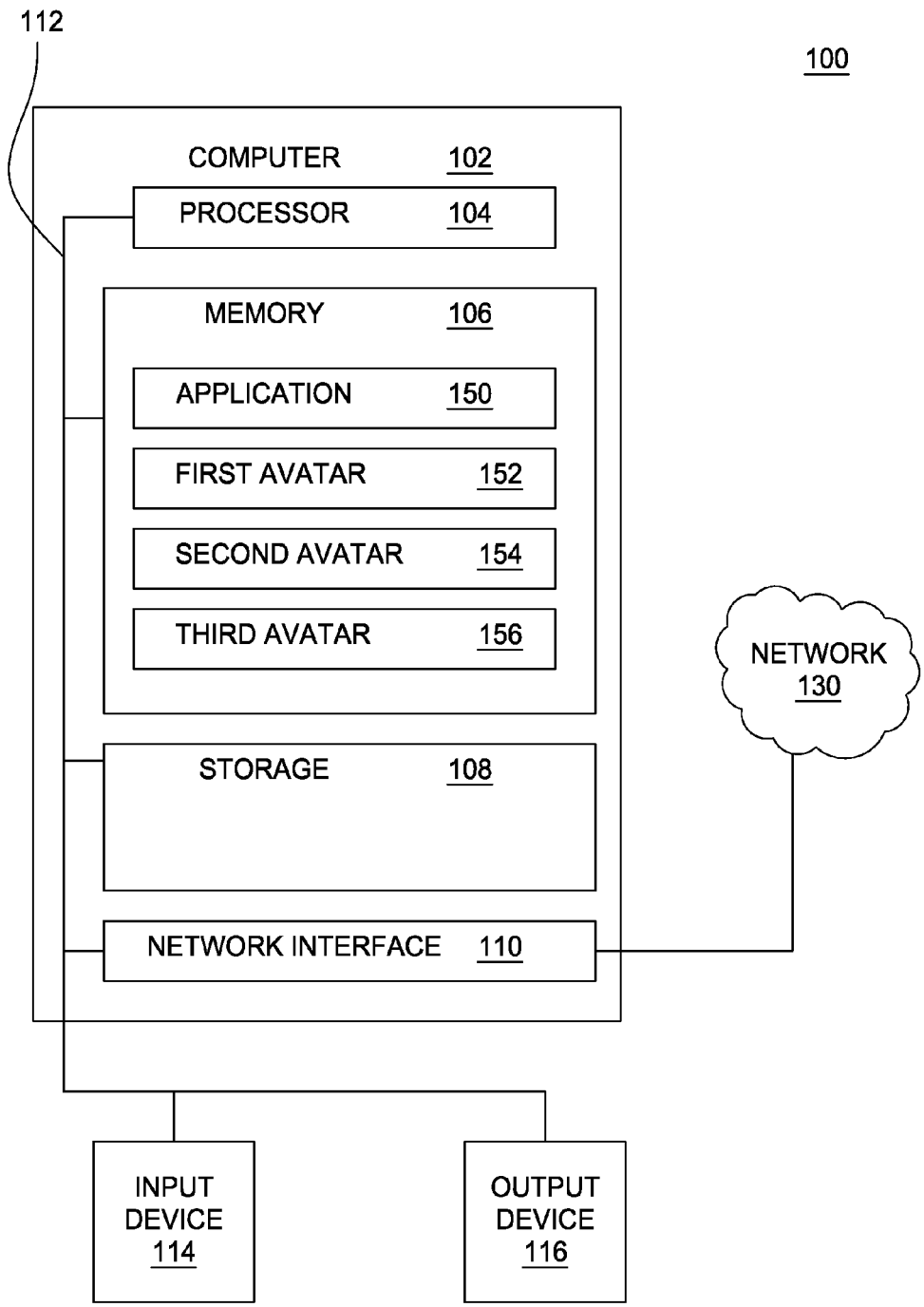
FIG. 1 is a block diagram illustrating a system for splitting an avatar in a virtual world, according to one embodiment of the invention.

Embodiments of the invention provide techniques for splitting a first avatar at any of multiple split points in a virtual world. In one embodiment, a virtual world client application (or simply, application) may designate multiple locations in the virtual world as split points. The application may detect that a first avatar has encountered one of the split points. The application may prompt a user of the first avatar to specify whether to split the first avatar. Upon receiving a request from the user to split the first avatar, the application may create a second avatar from the first avatar. The application may then control actions of the first avatar and the second avatar independently in the virtual world and in response to user input. Accordingly, the user may experience a "parallel universe" of the virtual world using the second avatar. Specifically, while the first avatar and the second avatar may both exist in the virtual world, the second avatar may act differently than the first avatar at any given point in time in the virtual world, thus leading to different outcomes and experiences of the second avatar, relative to the first avatar. As such, the experiences of the second avatar may be reminiscent of being in a "parallel universe" of the virtual world. Further, the user may request to merge the first avatar and the second avatar. Merging the first avatar and the second avatar combines the respective experiences of the first avatar and of the second avatar to create a third avatar in the virtual world.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 is a block diagram illustrating a system 100 for splitting an avatar in a virtual world, according to one embodiment of the invention. The system 100 includes a computer 102. The computer 102 may be connected to other computers via a network 130. In general, the network 130 may be a telecommunications network and/or a wide area network (WAN). In a particular embodiment, the network 130 is the Internet.

The computer 102 generally includes a processor 104 connected via a bus 112 to a memory 106, a network interface device 110, a storage 108, an input device 114, and an output device 116. The computer 102 is generally under the control of an operating system (not shown). Examples of operating systems include UNIX, versions of the Microsoft Windows® operating system, and distributions of the Linux® operating system. (Note: Linux is at trademark of Linus Torvalds in the United States and other countries.) More generally, any operating system supporting the functions disclosed herein may be used. The processor 104 is included to be representative of a single CPU, multiple CPUs, a single CPU having multiple processing cores, and the like. Similarly, the memory 106 may be a random access memory. While the memory 106 is shown as a single entity, it should be understood that the memory 106 may comprise a plurality of modules, and that the memory 106 may exist at multiple levels, from high speed registers and caches to lower speed but larger DRAM chips. The network interface device 110 may be any type of network communications device allowing the computer 102 to communicate with other computers via the network 130.

The storage 108 may be a hard disk drive storage device. Although the storage 108 is shown as a single unit, the storage 108 may be a combination of fixed and/or removable storage devices, such as fixed disc drives, floppy disc drives, tape drives, removable memory cards, or optical storage. The memory 106 and the storage 108 may be part of one virtual address space spanning multiple primary and secondary storage devices.

The input device 114 may be any device for providing input to the computer 102. For example, a keyboard, keypad, light pen, touch-screen, track-ball, or speech recognition unit, audio/video player, and the like may be used. The output device 116 may be any device for providing output to a user of the computer 102. For example, the output device 116 may be any conventional display screen or set of speakers, along with their respective interface cards, i.e., video cards and sound cards. Although shown separately from the input device 114, the output device 116 and input device 114 may be combined. For example, a display screen with an integrated touch-screen, a display with an integrated keyboard, or a speech recognition unit combined with a text speech converter may be used.

As shown, the memory 106 of the computer 102 includes an application 150, a first avatar 152, a second avatar 154, and a third avatar 156. The application may provide a user with a virtual world with which the user may interact. In one embodiment, the application may be a standalone virtual world application. Other embodiments are broadly contemplated without departing from the scope of the invention. For example, in an alternative embodiment, the application may include a virtual world client application and/or a virtual world server application. The virtual world client application and the virtual world server application may communicate with each other via the network 130 to provide the user with the virtual world.

Figure 2A:
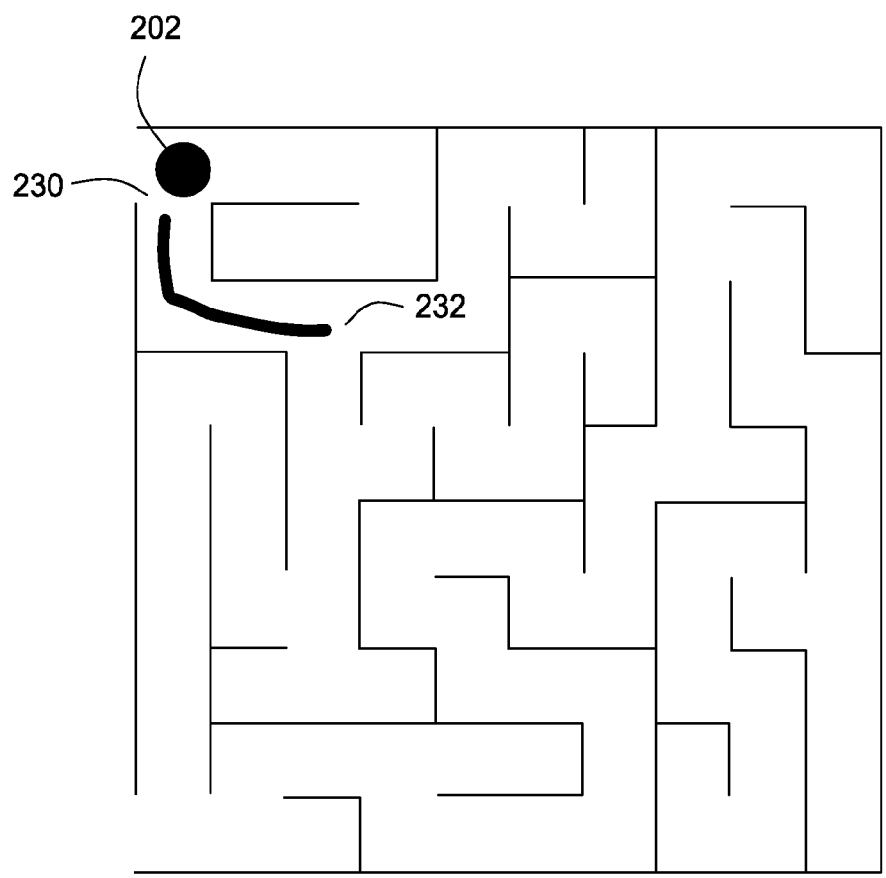
FIGS. 2A-C each illustrates a top-down view of a first avatar in the virtual world, according to one embodiment.
Figure 2B:
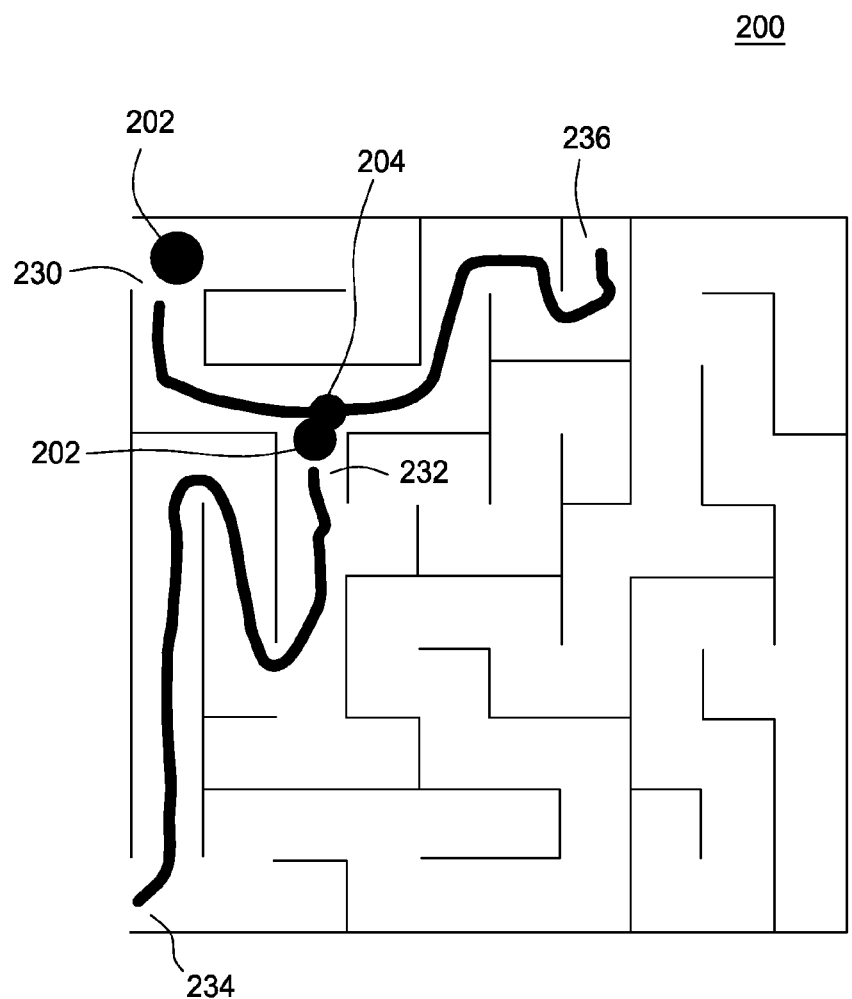
Figure 2C:
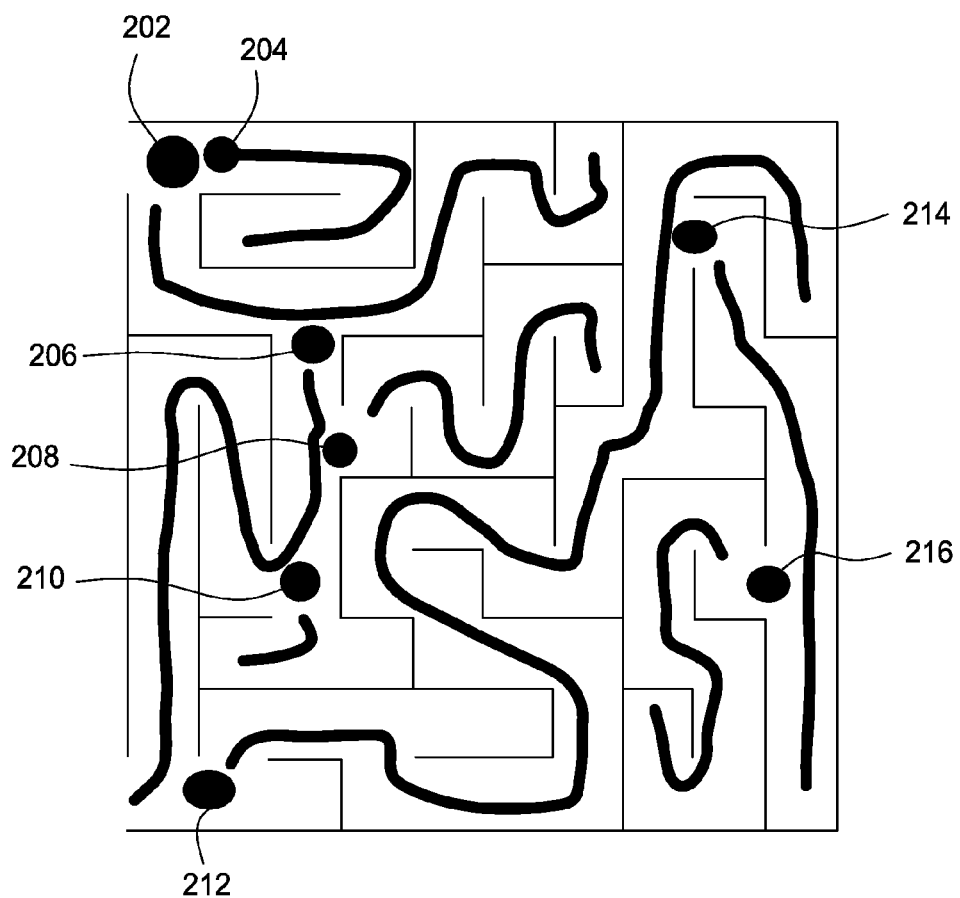

FIGS. 2A-C each illustrates a top-down view 200 of a first avatar 202 in the virtual world, according to one embodiment. In one embodiment, an application developer of the virtual world may select locations in the virtual world where a user is to be prompted whether the user desires to split the avatar (i.e., as the avatar arrives at a selected location). In another embodiment, the application 150 may itself designate locations in the virtual world where the user is to be prompted whether the user desires to split the avatar (e.g., at all forked paths of a labyrinth in the virtual world). More generally, the application 150 may determine one or more split points within the virtual world. Each split point corresponds to a point where a user may split an avatar within the virtual world into multiple copies.

While the designated split points have been described as locations in the virtual world, it is contemplated that a split point may be any event including a predefined moment in time (e.g., a specific date and time of the virtual world) or some particular occurrence (e.g., an avatar encounters a fork in a particular road). Thus, these events (split points) may be very specific in the context of time and space, or maybe more qualitative such that the events are satisfied (if at all) only when a plurality of predefined, but not necessarily deterministic, conditions is met.

For instance, the application 150 may designate each fork of a path (e.g., door #1 and door #2) in the virtual world as a split point. The application 150 may monitor presence of the avatar within the virtual world. If the application 150 determines that the avatar has encountered one of the split points, the application 150 may prompt the user whether to split the avatar.

In either case, the application 150 may allow a user of the first avatar 202 to split the first avatar 202 at any of the predetermined locations in the virtual world, according to one embodiment. As shown in FIG. 2A, the application 150 may move the first avatar 202 from a first location 230 to a second location 232 in the virtual world, based on user input. Further, suppose the second location 232 is one of the predetermined locations. When the first avatar 202 reaches the second location 232, the application 150 may prompt the user whether to split the first avatar 202. If the user opts to not split the first avatar 202, the application continues to move the first avatar 202 in the virtual world in response to user input.

However, if the user opts to split the first avatar 202, the application 150 may generate, at the second location 232, a second avatar from the first avatar 202. FIG. 2B illustrates a top-down view 200 of the first avatar 202 and the second avatar 204, according to one embodiment. The application 150 may then control actions of the first avatar 202 and the second avatar 204 independently in the virtual world, in response to user input. For example, the application 150 may receive input from the user for moving the first avatar 202 and input from a second user for moving the second avatar 204. That is, the first user may turn over control of the second avatar (i.e., the one in the parallel virtual universe) to a second user.

In another embodiment, the user may selectively provide input to the first avatar 202 or to the second avatar 204. In one embodiment, the application 150 may provide an interface mechanism to allow control over both the first avatar 202 and the second avatar 204. For example, the application 150 may display independent views of the virtual world from the perspective of each avatar. The independent views may be displayed alternately (based on a command for toggling between the separate views) or simultaneously (e.g., in a split-screen view). The user may enter a keystroke (e.g., TAB) to toggle between (displaying the perspective of and/or controlling) the two avatars. In one embodiment, the application may also freeze time in the virtual world for inactive avatars. An inactive avatar is an avatar for which the user is not (currently) providing any input. As the user toggles between avatars, the application may "unfreeze" time for any selected (toggled) avatar. Consequently, the application 150 may move split avatars in the virtual world simultaneously (in terms of the timeline of the virtual world), even though the application 150 may receive user input for the split avatars at different times in the real world. Thus, the user may respond to a time-sensitive event (e.g., a trap door opening within ten seconds of splitting an avatar, or a treasure chest disappearing within thirty seconds of splitting an avatar) differently using each split avatar, because the time-sensitive event will not expire for inactive avatars.

For example, suppose that the first avatar 202 appears at the first location 230, where the application 150 alerts the user all coins that are scattered across the virtual world are to disappear within thirty seconds. The user may navigate the first avatar 202 to the second location 232, where the application 150 prompts the user whether to split the first avatar 202, to which the user answers affirmatively. The application 150 may create a second avatar 204 from the first avatar 202. The user may navigate the first avatar 202 from the second location 232 to a third location 234 to find fifty coins at the third location 234 (before the twenty coins disappear). The user may also navigate the second avatar 204 from the second location 232 to a fourth location 236 to find twenty coins at the fourth location 236 (before the fifty coins disappear).

Continuing with this example, assume any remaining coins in the virtual world (that are not found by the user) disappear at this point. That is, the user controls the first avatar 202 (having twenty coins) at the third location 234 and the second avatar 204 (having fifty coins) at the fourth location 236. In one embodiment, the user may request to merge the split avatars (namely, the first avatar 202 and the second avatar 204). In response, the application 150 may generate a third avatar from both the first avatar 202 and the second avatar 204. Each avatar may include assets. The application may generate assets of the third avatar from assets of both the first avatar and the second avatar. As used herein, "assets" of an avatar refer to any state of the avatar such as attributes (e.g., character level of the split avatar), virtual possessions (e.g., coins of the split avatar), achievements (e.g., a designation that the split avatar has achieved a predefined goal), experiences (e.g., that the split avatar has spoken to a computer-controlled avatar, which may be required for the merged avatar to advance in the virtual world in terms of plot and/or location), etc.

Continuing the above example, the application 150 may generate a third avatar that includes a total of seventy coins (i.e., twenty plus fifty). Further, the user may specify where the third avatar is to be generated. For example, the user may select from: (i) the current location of the first avatar; (ii) the current location of the second avatar; or (iii) a location where the avatars were split. For instance, the application 150 may generate the third avatar at the third location 234 (i.e., in response to a user selection). The application 150 may then move the third avatar in the virtual world in response to user input (and starting from the third location 234).

In one embodiment, the user may split an avatar further. FIG. 2C illustrates a top-down view 200 of split avatars in the virtual world, according to one embodiment. As shown, the split avatars include eight avatars 202, 204, 206, 208, 210, 212, 214, 216. In one embodiment, the application splits the first avatar 202 into the eight avatars 202, 204, 206, 208, 210, 212, 214, 216 in response to successive requests to split an avatar. The user may then navigate the eight avatars 202, 204, 206, 208, 210, 212, 214, 216 independently in the virtual world. For example, the user may attempt to collect all available coins in the virtual world (i.e., before the coins disappear). Further, the user may choose to merge any number of split avatars into a merged avatar.

In one embodiment, in generating a merged avatar from split avatars, the application 150 may also scale down assets (of the split avatars) in a manner proportional to a total count of split avatars (to be merged). For example, the application may impose a penalty of twenty percent for coins collected by two split avatars. For instance, merging a first avatar having twenty coins and a second avatar having fifty coins may produce a third avatar having a total of fifty-six coins (i.e., fifty plus twenty, less a twenty percent penalty). Similarly, the application may impose a penalty of thirty percent for coins collected by three split avatars. Of course, those skilled in the art will recognize that the scaling of assets of split avatars may be tailored to suit the needs of a particular case.

When merging the split avatars, the application 150 may also scale down abilities of avatars split from an original avatar. For example, if the user controls a first split avatar while another user controls a second split avatar simultaneously (in the timeline of in the real world), the virtual world may impose a penalty of a ten percent reduction in speed of movement for both the first split avatar and the second split avatar. Of course, those skilled in the art will recognize that the scaling of abilities of split avatars may be tailored to suit the needs of a particular case.

The application 150 may also dissolve an avatar, according to one embodiment. For example, if the user finds a split avatar to be undesirable, the user may request to dissolve the split avatar. In response, the application 150 may delete the split avatar from the virtual world. The application 150 may also remove any restrictions of other split avatars in accordance with deleting the split avatar. For example, the application 150 may remove any penalty of a ten percent reduction in speed of movement owing to the existence of the split avatar (i.e., the dissolved avatar).

While embodiments herein are described with reference to freezing time for inactive avatars, other embodiments are broadly contemplated without departing from the scope of the invention. For example, in one embodiment, the user may opt to not freeze time for any (even inactive) avatars. For instance, the user may view a scene in the virtual world simultaneously from the perspectives of multiple split avatars. In another embodiment, the user may selectively unfreeze time for specific inactive avatars.

In one embodiment, the application 150 may accept user input to guide the manner in which the application 150 merges split avatars. FIG. 3 illustrates a table 300 that lists assets 304 of avatars 302 in a virtual world, according to one embodiment. The assets include age, gender, coins, profession, and marital status. FIG. 3 includes the assets 304 for avatars A, B, and C. As shown, avatar A is a 21-year-old, single female student having 45 coins in the virtual world. Further, avatar B is a 49-year-old, divorced female CEO having 76 coins in the virtual world. Further still, avatar C is a 34-year-old, married female consultant having 24 coins in the virtual world.

Suppose the user desires to merge the avatars A, B, and C. Rather than having the application 150 determine (on its own) how the assets of the merged avatar are to be generated from the assets of the avatars A, B, and C, the user may specify desired criteria for merging the avatars A, B, and C. More specifically, the user may select desired characteristics from the respective avatars A, B, and C. For example, the user may specify that the merged avatar is to have the age of avatar C (i.e., age 34). Further, the user may specify that the merged avatar is to have the gender of avatar A (i.e., a female). Further still, the user may specify that the merged avatar is to have the number of coins of avatar B (i.e., 76 coins). The user may also specify that the merged avatar is to have the profession of avatar A (i.e., a student). In addition, the user may specify that the merged avatar is to have the marital status of avatar C (i.e., married status).

In one embodiment, the application 150 may merge the avatars according to the specified criteria. That is, the application 150 may create a merged avatar that is a 34-year-old, married female student having 76 coins in the virtual world. Of course, those skilled in the art will recognize that the merging of avatars based on specified criteria may be tailored to suit the needs of a particular case. For example, the virtual world may impose a rule that limits a user to specifying no more than three desired assets for a merge.

Many virtual worlds allow (or even require) a user to select an in-world profession or type for an avatar. Examples of professions include a wizard, a warrior, a consultant, etc. Further, such virtual worlds may restrict or modify what attributes are available to a user, based on a choice of profession. Often, once the user selects a profession for the avatar, the selected profession is assigned to the avatar for the remainder of the avatar's existence in the virtual world. Further, many virtual worlds offer content (e.g., story elements) exclusive to a specific profession. Consequently, it may be cumbersome or even impractical for a user to experience story elements of other professions. Even assuming the virtual world allows changing professions, the virtual world may require the user to complete a series of tasks (or quests) to change the profession of an existing avatar. Such a series of tasks may be burdensome for the user to complete. Alternatively, the user may attempt to create a new avatar altogether to experience story elements exclusive to a specific profession. However, creating a new avatar may be impractical. For example, a virtual world may allow a maximum of three avatars while offering a total of twenty professions. To delete an existing avatar to experience a fourth profession may be unacceptable to the user.

In one embodiment, the user may split an avatar prior to selecting a profession. The user may then select multiple professions for the split avatars (i.e., a different profession for each avatar). The split avatars may progress independently in the virtual world based on user input. Consequently, the user may conveniently experience story elements specific to a profession. The user may also conveniently assess whether a specific profession is to the liking of the user. The user may abandon a split avatar of a profession (or having associated story elements) found to be undesirable (e.g., by requesting to dissolve the split avatar). The user may also merge a split avatar of an undesirable profession with a split avatar of a desirable profession to at least retain any desirable assets of the split avatar of the undesirable profession (e.g., coins).

Figure 4:
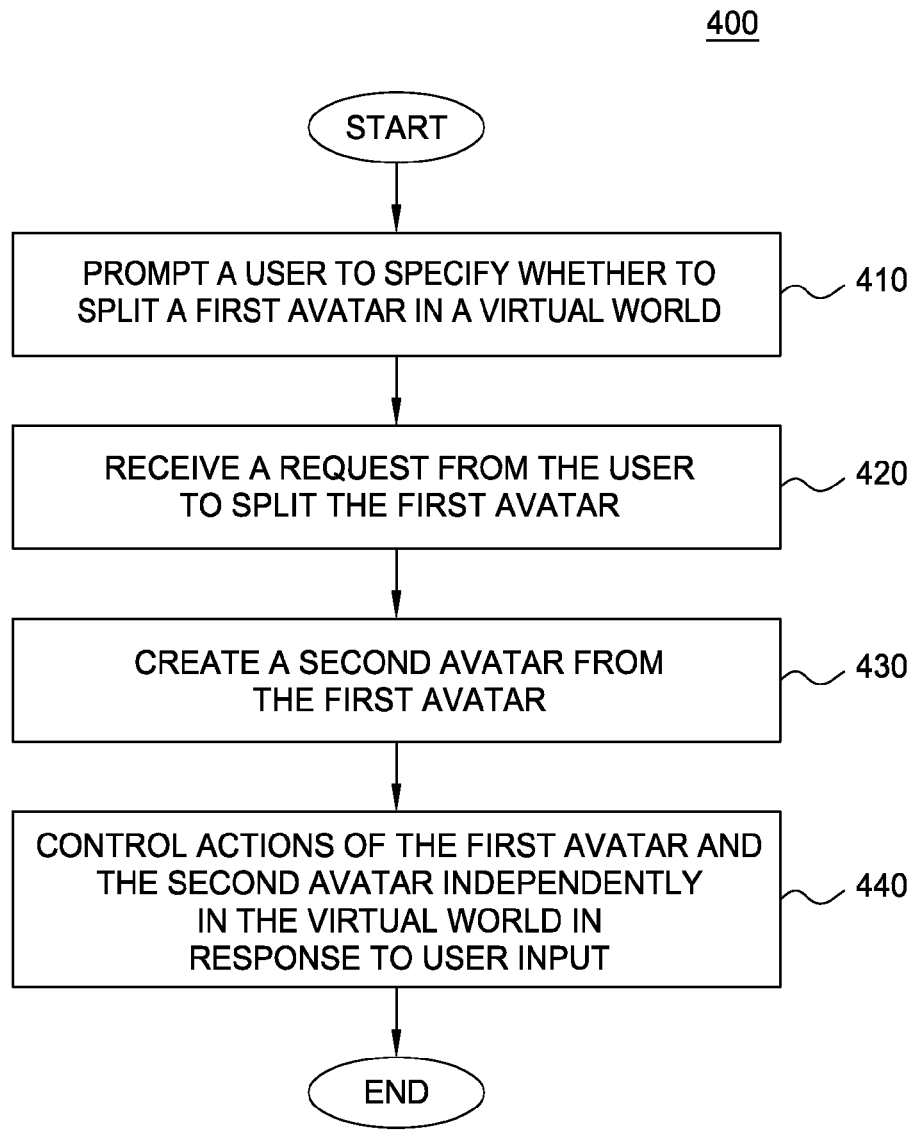
FIG. 4 is a flowchart depicting a method for splitting an avatar in the virtual world, according to one embodiment of the invention.

FIG. 4 is a flowchart depicting a method 400 for splitting an avatar in the virtual world, according to one embodiment of the invention. As shown, the method 500 begins at step 510, where the application 150 prompts a user whether to split a first avatar in the virtual world. At step 420, the application 150 may receive, from the user, a request to split the first avatar. At step 430, the application 150 may create a second avatar from the first avatar. At step 440, the application 150 may control actions of the first avatar and the second avatar independently in the virtual world, in response to user input. After the step 440, the method 400 terminates.

Figure 5:
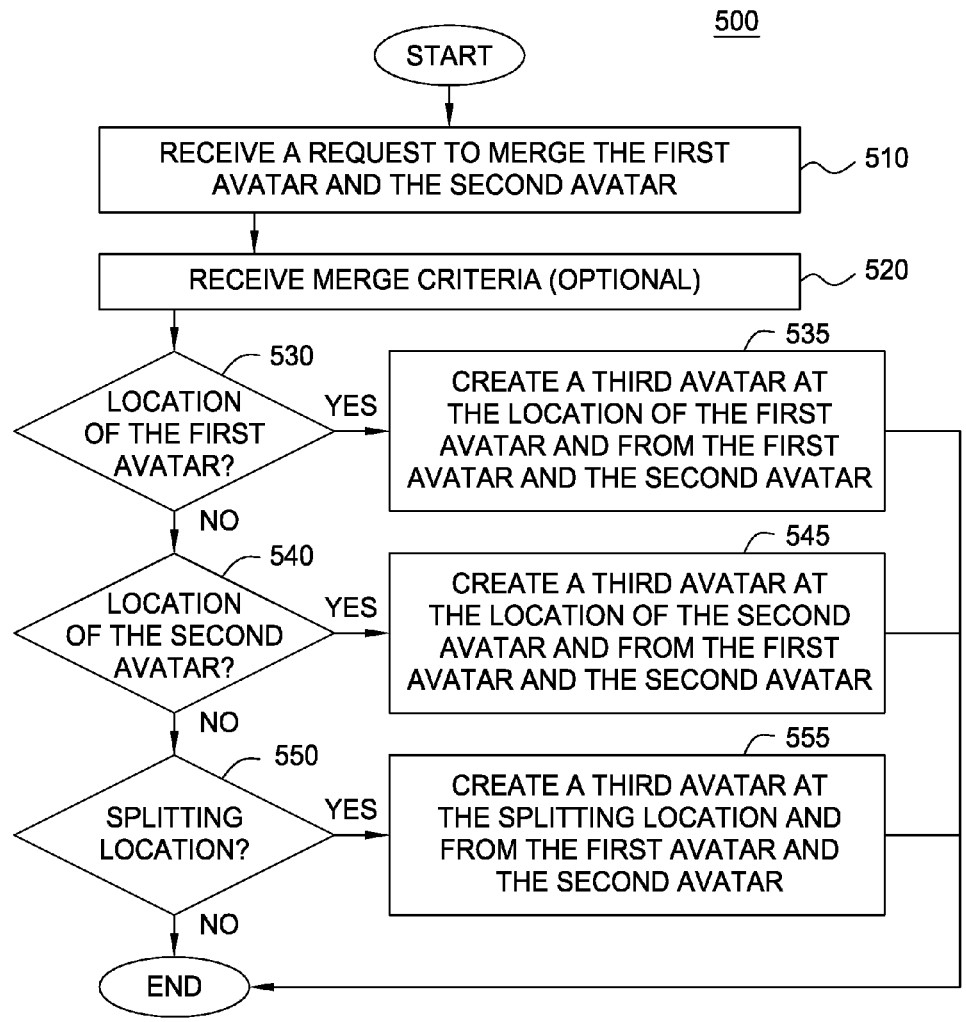
FIG. 5 is a flowchart depicting a method for merging two avatars in the virtual world, according to one embodiment of the invention.

FIG. 5 is a flowchart depicting a method 500 for merging two avatars in a virtual world, according to one embodiment of the invention. As shown, the method 500 begins at step 510, where the application 150 receives a request from the user to merge the first avatar and the second avatar. At step 520, the application 150 optionally receives merging criteria from the user. The request from the user to merge the first avatar and the second avatar may also include a desired location for a merged avatar, according to one embodiment. If the desired location is the location of the first avatar (step 530), the application 150 creates the third avatar at the location of the first avatar and from the first avatar and the second avatar (step 535). If the desired location is the location of the second avatar (step 540), the application 150 creates the third avatar at the location of the second avatar and from the first avatar and the second avatar (step 545). If the desired location is the location where the first avatar and the second avatar were previously split from an original avatar (step 550), the application 150 creates the third avatar at the location of the split and from the first avatar and the second avatar (step 555). If no desired location is specified, the method 500 may terminate (or create the third avatar at a default location, e.g., the split location). After the steps 535, 545, 555, or 550, the method 500 terminates.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Advantageously, embodiments of the invention provide an application configured to split an avatar in a virtual world. In one embodiment, the application may prompt a user of a first avatar whether to split the first avatar. Upon receiving a request from the user to split the first avatar, the application may create a second avatar from the first avatar. The application may then control actions of the first avatar and the second avatar independently in the virtual world, in response to user input. Accordingly, the user may experience a "parallel universe" of the virtual world using the second avatar. Specifically, while the first avatar and the second avatar may both exist in the virtual world, the second avatar may act differently than the first avatar at any given point in time in the virtual world, thus leading to different outcomes and experiences of the second avatar, relative to the first avatar. As such, the experiences of the second avatar may be reminiscent of being in a "parallel universe" of the virtual world. If the virtual world offers professions, the user may take on different professions on each avatar to access profession-specific content in the virtual world. Further, the user may request to merge the first avatar and the second avatar. Merging the first avatar and the second avatar combines the respective experiences of the first avatar and of the second avatar to create a third avatar in the virtual world. The user may also specify criteria to guide how the application merges avatars.

While the foregoing is directed to embodiments of the present invention, other and further embodiments of the invention may be devised without departing from the basic scope thereof, and the scope thereof is determined by the claims that follow.

What is claimed is:

1. A computer-implemented method of splitting an avatar into multiple avatars at a split point in a virtual world, to allow independent control of the multiple avatars in the virtual world, the method comprising:

determining one or more split points within the virtual world, wherein each split point corresponds to a respective location in the virtual world, at which a first avatar is selectively split within the virtual world into multiple avatars;

monitoring presence of the first avatar within the virtual world; wherein selection of whether to split the first avatar in the virtual world is precluded, in the event that the first avatar is at a first location not corresponding to any of the one or more split points;

upon determining that the first avatar is at a second location, different from the first location and corresponding to one of the one or more split points, issuing a prompt in order to permit selection of whether to split the first avatar in the virtual world;

responsive to the prompt, receiving a request to split the first avatar;

creating a second avatar from the first avatar by operation of one or more computer processors and responsive to the request to split the first avatar, thereby splitting the first avatar; and controlling actions of the first avatar and the second avatar independently of one another in the virtual world, based on avatar control input received subsequent to splitting the first avatar.

2. The computer-implemented method of claim 1, wherein controlling the actions of the first avatar and the second avatar is done responsive to user input and comprises:

moving the first avatar in the virtual world in response to input from a user; and moving the second avatar in the virtual world independently of the first avatar and in response to input from a second user.

3. The computer-implemented method of claim 1, further comprising:

receiving a request to merge the first avatar and the second avatar; and creating a third avatar from the first avatar and the second avatar, responsive to the request to merge the first avatar and the second avatar.

4. The computer-implemented method of claim 3, wherein creating the third avatar from the first avatar and the second avatar comprises combining assets of the first avatar and of the second avatar, and wherein assets is selected from at least one of: (i) experiences; (ii) achievements; (iii) virtual possessions; and (iv) attributes of the first avatar and of the second avatar.

5. The computer-implemented method of claim 1, further comprising:

receiving a request to remove one of the first avatar and the second avatar; and removing the one of the first avatar and the second avatar, responsive to the request to remove.

6. The computer-implemented method of claim 1, further comprising:

determining an event the occurrence of which causes the prompt to issue to split the first avatar, wherein the event is selected from one of a location in the virtual world and a time of the virtual world.

7. The computer-implemented method of claim 1, thereby permitting the first avatar to split at the second location while precluding the first avatar from splitting at the first location, based on the one or more split points determined in the virtual world, wherein the prompt is issued during gameplay, wherein the first avatar is split at the split point, such that both the first avatar and the second avatar are disposed at the split point upon being split, wherein the avatar control input received subsequent to splitting the first avatar includes:

(i) a first avatar control input specifying to control an action of the first avatar; and (ii) a second avatar control input that is different from the first avatar control input and that specifies to control an action of the second avatar, different from the action of the first avatar.

8. The computer-implemented method of claim 7, wherein the actions of the first and second avatars are controlled by a virtual world application in response to user input, wherein the virtual world application is configured to control actions of the first and second avatars based on each individual user input selected from:

(i) respective inputs from a first user and from a second user; and (ii) input solely from the first user.

9. The computer-implemented method of claim 8, wherein the actions include moving the first and second avatars from the split point to distinct, respective locations in the virtual world, other than the split point, wherein the method further comprises:

receiving, in a first instance, a request to merge the first avatar and the second avatar; and creating a third avatar from the first avatar and the second avatar, responsive to the request to merge the first avatar and the second avatar.

10. The computer-implemented method of claim 9, wherein creating the third avatar from the first avatar and the second avatar comprises combining assets of the first avatar and of the second avatar, wherein the virtual world application is configured to independently combine each individual asset selected from:

(i) distinct, respective experiences of the first and second avatars;

(ii) distinct, respective achievements of the first and second avatars;

(iii) distinct, respective virtual possessions of the first and second avatars; and (iv) distinct, respective attributes of the first and second avatars.

11. The computer-implemented method of claim 10, wherein the assets are scaled down to an extent proportional to a total count of avatars split from the first avatar;

wherein the virtual world application is configured to, in respective instances, create the third avatar at each user-specified location selected from:

(i) a location of the first avatar in the virtual world;

(ii) a location of the second avatar in the virtual world; and (iii) a location where the second avatar is split from the first avatar in the virtual world.

12. The computer-implemented method of claim 11, further comprising:

determining an event the occurrence of which causes the prompt to issue to split the first avatar, wherein the event is selected from one of a location in the virtual world and a time of the virtual world;

receiving, in a second instance, a request to remove one of the first avatar and the second avatar; and removing the one of the first avatar and the second avatar, responsive to the request to remove.

13. A non-transitory computer-readable medium containing a program, which, when executed on a processor, performs an operation to split an avatar into multiple avatars at a split point in a virtual world, to allow independent control of the multiple avatars in the virtual world, the operation comprising:

determining one or more split points within the virtual world, wherein each split point corresponds to a respective location in the virtual world, at which a first avatar is selectively split within the virtual world into multiple avatars;

monitoring presence of the first avatar within the virtual world; wherein selection of whether to split the first avatar in the virtual world is precluded, in the event that the first avatar is at a first location not corresponding to any of the one or more split points;

upon determining that the first avatar is at a second location, different from the first location and corresponding to one of the one or more split points, issuing a prompt in order to permit selection of whether to split the first avatar in the virtual world;

responsive to the prompt, receiving a request to split the first avatar;

creating a second avatar from the first avatar by operation of one or more computer processors when executing the program and responsive to the request to split the first avatar, thereby splitting the first avatar; and controlling actions of the first avatar and the second avatar independently of one another in the virtual world, based on avatar control input received subsequent to splitting the first avatar.

14. The non-transitory computer-readable medium of claim 13, wherein controlling the actions of the first avatar and the second avatar is done responsive to user input and comprises:

moving the first avatar in the virtual world in response to input from a user; and moving the second avatar in the virtual world independently of the first avatar and in response to input from a second user.

15. The non-transitory computer-readable medium of claim 13, wherein the operation further comprises:

receiving a request to merge the first avatar and the second avatar; and creating a third avatar from the first avatar and the second avatar, responsive to the request to merge the first avatar and the second avatar.

16. The non-transitory computer-readable medium of claim 15, wherein creating the third avatar from the first avatar and the second avatar comprises combining assets of the first avatar and of the second avatar, and wherein assets is selected from at least one of: (i) experiences; (ii) achievements; (iii) virtual possessions; and (iv) attributes of the first avatar and of the second avatar.

17. The non-transitory computer-readable medium of claim 13, wherein the operation further comprises:

receiving a request to remove one of the first avatar and the second avatar; and removing the one of the first avatar and the second avatar, responsive to the request to remove.

18. The non-transitory computer-readable medium of claim 13, wherein the operation further comprises:

determining an event the occurrence of which causes the prompt to issue to split the first avatar, wherein the event is selected from one of a location in the virtual world and a time of the virtual world.

19. A system to split an avatar into multiple avatars at a split point in a virtual world, to allow independent control of the multiple avatars in the virtual world, the system comprising:

one or more computer processors; and a non-transitory memory containing a program, which when executed by the one or more computer processors is configured to perform an operation comprising:

determining one or more split points within the virtual world, wherein each split point corresponds to a respective location in the virtual world, at which a first avatar is selectively split within the virtual world into multiple avatars;

monitoring presence of the first avatar within the virtual world; wherein selection of whether to split the first avatar in the virtual world is precluded, in the event that the first avatar is at a first location not corresponding to any of the one or more split points;

upon determining that the first avatar is at a second location, different from the first location and corresponding to one of the one or more split points, issuing a prompt in order to permit selection of whether to split the first avatar in the virtual world;

responsive to the prompt, receiving a request to split the first avatar;

creating a second avatar from the first avatar, responsive to the request to split the first avatar, thereby splitting the first avatar; and controlling actions of the first avatar and the second avatar independently of one another in the virtual world, based on avatar control input received subsequent to splitting the first avatar.

20. The system of claim 19, wherein controlling the actions of the first avatar and the second avatar is done responsive to user input and comprises:

moving the first avatar in the virtual world in response to input from a user; and moving the second avatar in the virtual world independently of the first avatar and in response to input from a second user.

21. The system of claim 19, wherein the operation further comprises:

receiving a request to merge the first avatar and the second avatar; and creating a third avatar from the first avatar and the second avatar, responsive to the request to merge the first avatar and the second avatar.

22. The system of claim 21, wherein creating the third avatar from the first avatar and the second avatar comprises combining assets of the first avatar and of the second avatar, and wherein assets is selected from at least one of: (i) experiences; (ii) achievements; (iii) virtual possessions; and (iv) attributes of the first avatar and of the second avatar.

23. The system of claim 19, wherein the operation further comprises:

receiving a request to remove one of the first avatar and the second avatar; and removing the one of the first avatar and the second avatar, responsive to the request to remove.

24. The system of claim 19, wherein the operation further comprises:

determining an event the occurrence of which causes the prompt to issue to split the first avatar, wherein the event is selected from one of a location in the virtual world and a time of the virtual world.

\* \* \* \* \*